United States Patent
Park et al.

(10) Patent No.: US 8,408,088 B2
(45) Date of Patent: Apr. 2, 2013

(54) APPARATUS FOR REMOVING PARKING STATE OF SHIFT-BY-WIRE SHIFTING DEVICE

(75) Inventors: Hangil Park, Hwaseong-si (KR); Changhyun Lee, Seoul (KR); Jeongho Park, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 260 days.

(21) Appl. No.: 12/880,926

(22) Filed: Sep. 13, 2010

(65) Prior Publication Data

US 2011/0132121 A1    Jun. 9, 2011

(30) Foreign Application Priority Data

Dec. 4, 2009  (KR) .................... 10-2009-0119734

(51) Int. Cl.
*B60K 20/00*    (2006.01)
*G05G 5/00*    (2006.01)

(52) U.S. Cl. ............... 74/473.23; 74/473.21; 74/473.12; 74/500.5; 74/501.5 R; 74/502.4; 74/502.6; 74/606 R (58) Field of Classification Search .......... 74/473.3, 74/473.12, 473.14, 473.15, 473.18, 473.29, 74/473.21, 473.22, 473.23, 473.24, 473.25, 74/89.2, 89.23, 89.26, 500.5, 501.5 R, 501.6, 74/502.1, 502.4, 502.6, 504, 606 R See application file for complete search history.

(56) References Cited

U.S. PATENT DOCUMENTS

| | | | | | |
|---|---|---|---|---|---|
| 5,588,330 | A | * | 12/1996 | Kataumi et al. | ............ 74/483 R |
| 5,943,910 | A | * | 8/1999 | Babinski | ............ 74/89.35 |
| 6,148,689 | A | * | 11/2000 | Uneme | ............ 74/502.1 |
| 6,662,924 | B2 | | 12/2003 | Giefer et al. | |
| 2012/0138394 | A1 | * | 6/2012 | Park et al. | ............ 188/1.11 E |

FOREIGN PATENT DOCUMENTS

| | | |
|---|---|---|
| JP | 309354 A | 12/1997 |
| JP | 2006-322489 A | 11/2006 |
| JP | 2006322489 A * | 11/2006 |
| KR | 1999-0048288 A | 7/1999 |
| KR | 1020060134439 A | 12/2006 |

* cited by examiner

*Primary Examiner* — David M Fenstermacher
*Assistant Examiner* — Luis E Lopez-Garcia
(74) *Attorney, Agent, or Firm* — Morgan, Lewis & Bockius LLP

(57) ABSTRACT

An apparatus for releasing a parking state of a shift-by-wire shifting device may include a housing fixed to a vehicle body, a driving screw rotatably coupled to the housing and threaded, a slider engaged to the driving screw and slidable along the driving screw, and a cable connected to the slider and transmitting a sliding motion of the slider to a transmission.

8 Claims, 7 Drawing Sheets

APPARATUS FOR REMOVING PARKING STATE OF SHIFT-BY-WIRE SHIFTING DEVICE

CROSS-REFERENCE TO RELATED APPLICATIONS

The present application claims priority to Korean Patent Application Number 10-2009-0119734 filed Dec. 4, 2009, the entire contents of which application is incorporated herein for all purposes by this reference.

BACKGROUND OF THE INVENTION

1. Field of the Invention

The present invention relates to an apparatus for mechanically removing a parking state in a vehicle equipped with a shift-by-wire shifting device.

2. Description of Related Art

Shift-by-wire shifting devices are devices that control a transmission, using electric signals, in response to signals generated when a driver operates the shift lever, without transmitting the operational force of the shift lever applied by the user through a mechanical cable, as in the related art.

Double parking or parallel parking is frequently unavoidable due to insufficient parking space in Korea, and accordingly, it is required to park in the N-range state such that vehicles can be pushed by external force.

Further, it is required to remove the parking state such that the vehicle wheels can freely rotate, when washing the vehicle with a car washing apparatus.

Further, it is required to manually shift between the P-range state and the N-range state in the vehicles equipped with the shift-by-wire shifting device, as described above, when a problem occurs in the electric system, such as discharge, which is prescribed by law.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an apparatus for removing a parking state of a shift-by-wire shifting device that allows N-range parking and automatic car washing by making it possible to shift a transmission from the P-range state to the N-range state with a mechanical mechanism, and makes it possible to manually shift between the P-range state and the N-range state, when a problem occurs in the electric system, such as discharge, in a vehicle equipped with a shift-by-wire shifting device.

In an aspect of the present invention, the apparatus for releasing a parking state of a shift-by-wire shifting device may include a housing fixed to a vehicle body, a driving screw rotatably coupled to the housing and threaded, a slider engaged to the driving screw and slidable along the driving screw, and a cable connected to the slider and transmitting a sliding motion of the slider to a transmission.

The slider may include a guide surface to be slidably engaged to the housing to prevent the slider from rotating along the driving screw but allow the slider to slide along the driving screw.

The driving screw may include a stopper at a lower potion thereof to restrict a downward movement of the slider below the stopper.

At least one end of the driving screw may be exposed outside the housing, wherein a manual operating portion having a non-uniform shape in the rotational direction about a rotational axis of the driving screw to receive torque from the outside is formed at the at least one end of the driving screw, and wherein the manual operating portion is a driver groove formed at the at least one end of the driving screw, and wherein the vehicle body is a shift lever bracket having a through hole and the manual operating portion is reachable from the outside through the through hole to rotate the driving screw.

A driven gear may be integrally formed with the driving screw to reduce and receive rotational force transmitted from the outside, and an actuator providing rotational force to the driven gear may be further disposed in the housing and engaged with the driven gear, wherein the actuator is an electric motor fixed to the housing, and an idler gear is disposed and engaged between a pinion of the electric motor and the driven gear of the driving screw to reduce rotational force of the pinion and transmit a rotational force of the actuator to the driven gear.

A mass damper may be connected between the transmission and the slider on the cable.

The present invention allows N-range parking and automatic car washing by making it possible to shift a transmission from the P-range state to the N-range state with a mechanical mechanism, and makes it possible to manually shift between the P-range state and the N-range state, when a problem occurs in the electric system, such as discharge, in a vehicle equipped with a shift-by-wire shifting device.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
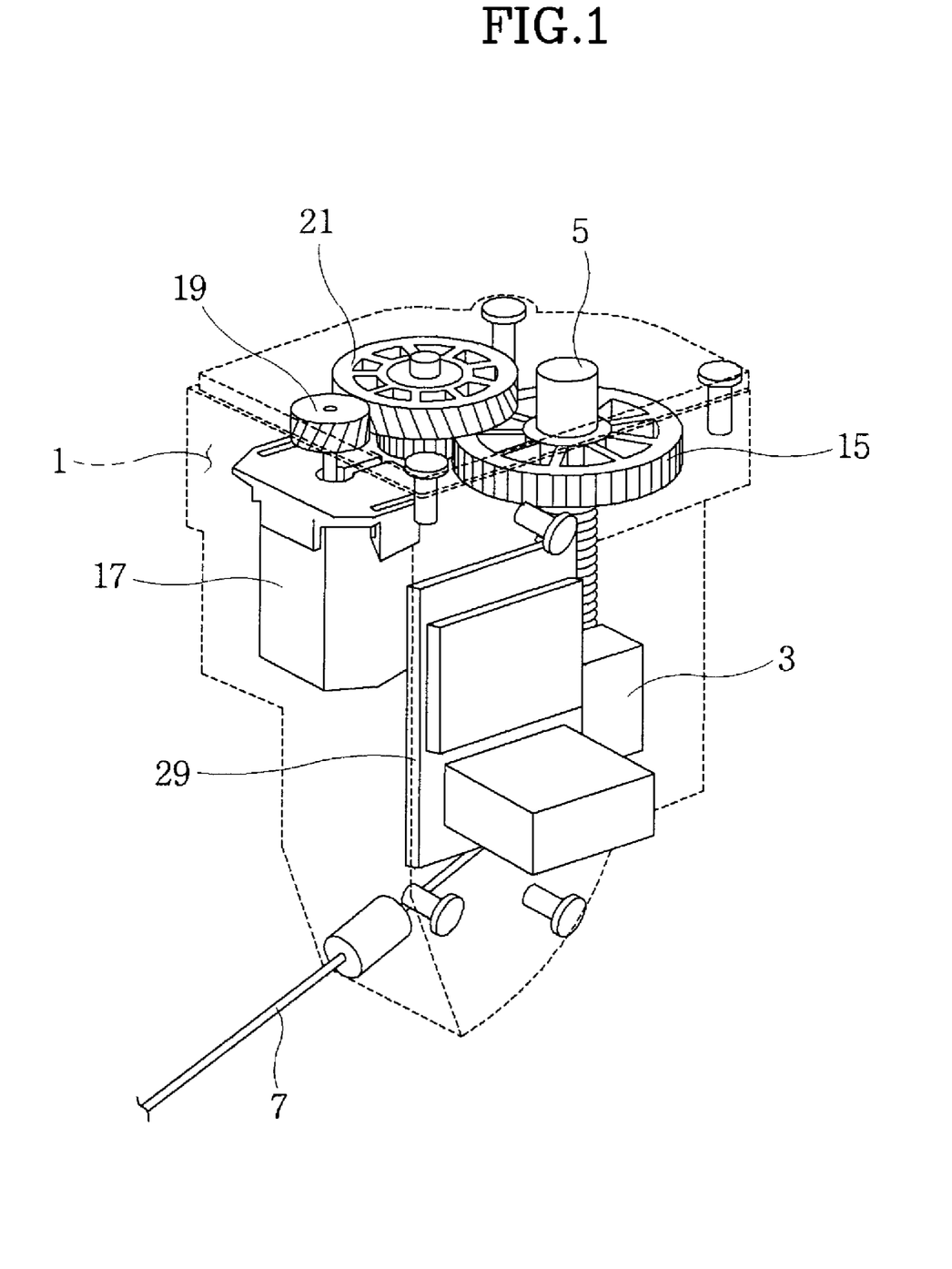
FIG. 1 is a view illustrating the structure of an apparatus for removing a parking state of a shift-by-wire shifting device according to an exemplary embodiment of the present invention.
Figure 2:
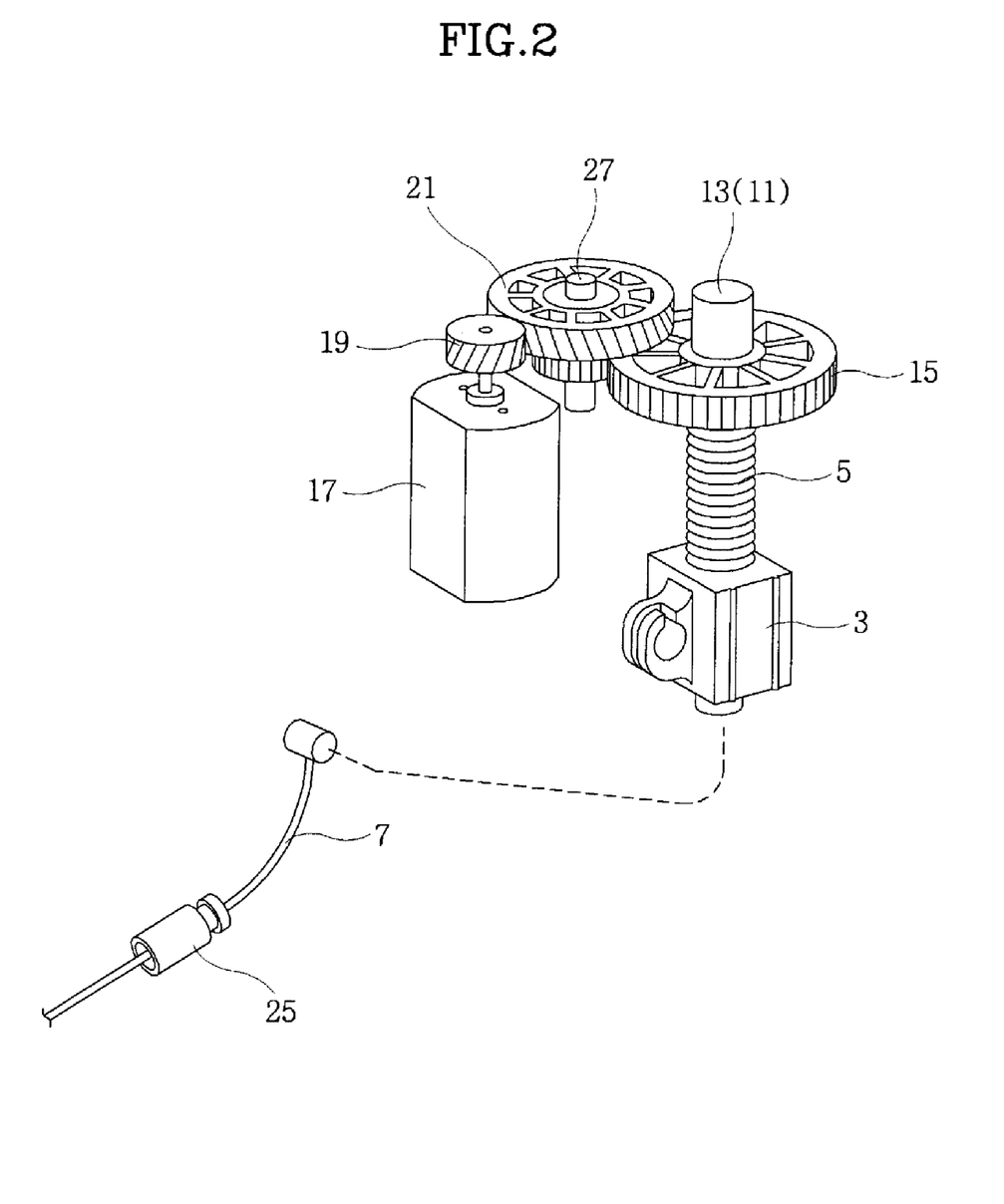
FIG. 2 is a view showing the main parts of FIG. 1.
Figure 3:
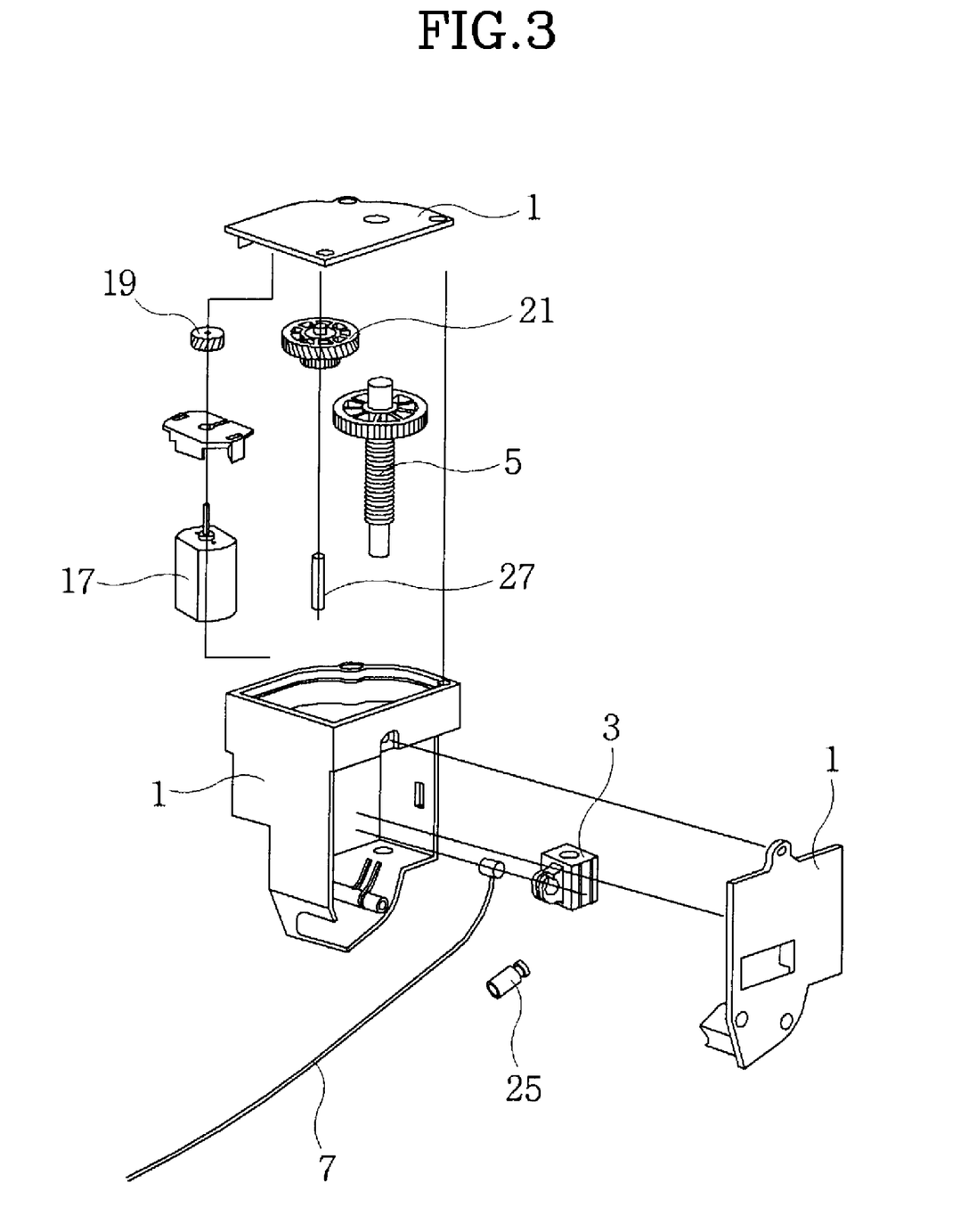
FIG. 3 is an exploded perspective view of the apparatus of FIG. 1.

Referring to FIGS. 1 to 3, an apparatus for removing a parking state of a shift-by-wire shifting device according to an exemplary embodiment of the present invention includes a housing 1 fixed to the vehicle body, a slider 3 disposed to slidable straight with respect to housing 1, a driving screw 5 rotatably fixed to housing 1 and thread-fastened to slider 3 to move slider 3 along a straight path, and a cable 7 connected to slider 3 to transmit the straight sliding motion of slider 3 to a transmission 9.

That is, as driving screw 5 rotates, slider 3 slides straight in housing 1 and the straight sliding motion of slider 3 is transmitted to transmission 9 through cable 7, such that transmission shifts from the P-range state to the N-range state by the transmitted straight motion.

The slider 3 include a guide surface 35 slidably engaged to the housing 1 to prevent a rotation of the slider 3 but allow a sliding motion with respect to the driving screw 5.

An elastic member, such as a spring, in transmission 9 pulls cable 7, such that when slider 3 loosens cable 7, cable 7 is pulled by the elastic member and the transmission shifts to the P-range.

Figure 7:
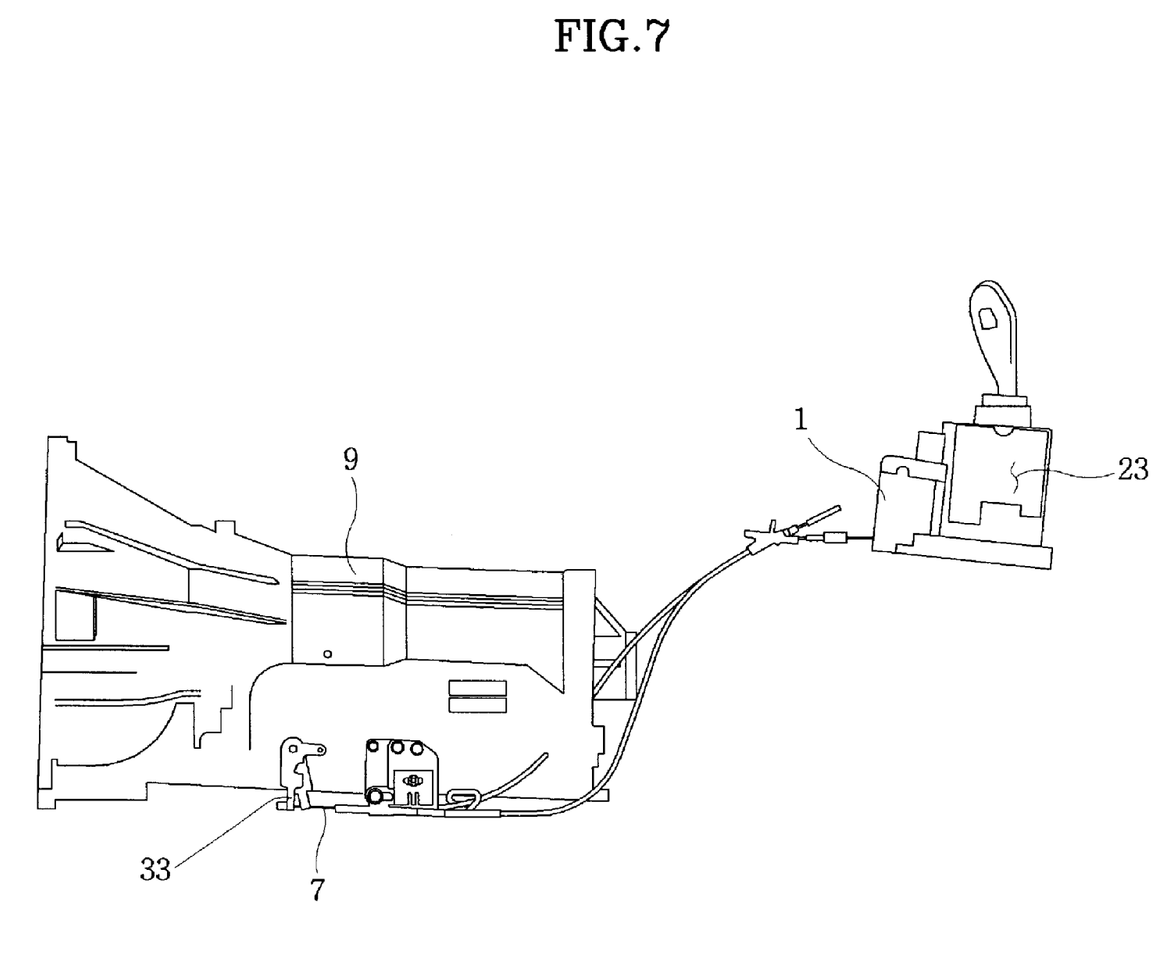
FIG. 7 is a side view illustrating the structure of an apparatus for removing a parking state of a shift-by-wire shifting device according to an exemplary embodiment of the present invention.

For example, as shown in FIG. 7, transmission 9 has a lever 33 that rotates to shift between the P-range and the N-range and cable 7 is connected to lever 33. Further, the elastic member (not shown) elastically supports lever 33 to rotate it toward the P-state state and pulls cable 7.

At least one end of driving screw 5 is exposed to the outside and a manual operating portion 11 having a non-uniform shape in the rotational direction about the rotational axis of driving screw 5 to easily receive torque from the outside is formed at the exposable end of driving screw 5.

The configuration in which the end of driving screw 5 can be exposed implies that the end is always exposed to the outside or a user directly accesses the end of driving screw 5 by simply removing a cover etc.

In the present embodiment, manual operating portion 11 is a driver groove 13 formed at the end of driving screw 5.

Alternatively, driving screw 5 can be rotated by various tools, in which manual operating portion 11 may be a wrench groove or a polygonal bolt head.

Further, a driven gear 15 is integrally formed with driving screw 5 to reduce and receive rotational force transmitted from the outside and an actuator providing rotational force to driven gear 15 is further disposed in housing 1.

In the present embodiment, the actuator is an electric motor 17 fixed to housing 1. That is, driving screw 5 is automatically rotated to pull or release cable 7 by operating electric motor 17.

An idler gear 21 is disposed between a pinion 19 of electric motor 17 and driven gear 15 of driving screw 5 to smoothly operate driving screw 5 with a motor having a small capacity by reducing rotational force of pinion 19 and transmitting it to driven gear 15.

Figure 6:
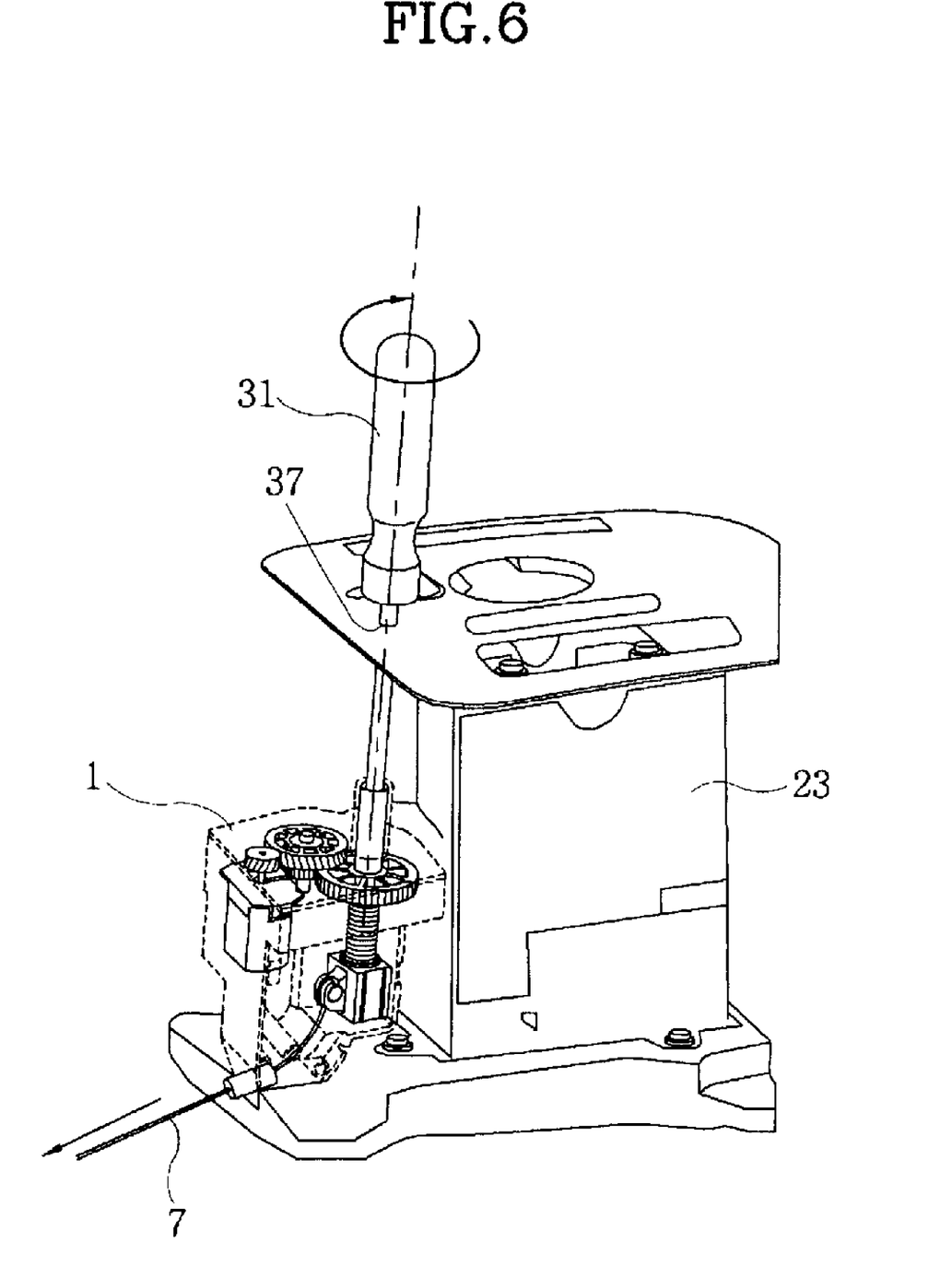
FIG. 6 is a view illustrating when the apparatus of FIG. 1 is manually operated.

For reference, housing 1, as exemplified in FIG. 6, is positioned at a side of shift lever bracket 23 having a through hole 37 in the vehicle, cable 7 is provided with a mass damper 25 to block vibration transmitted from transmission 9, and housing 1 is composed of a plurality of covers in FIG. 3, but they are entirely called housing 1.

Further, a gear shaft 27 that functions as the rotational center of idler gear 21 is shown in FIG. 3, and a circuit board 29 with an electronic circuit, such as a controller, for operating electric motor 17 by operating a specific switch is disposed in housing 1.

Figure 4:
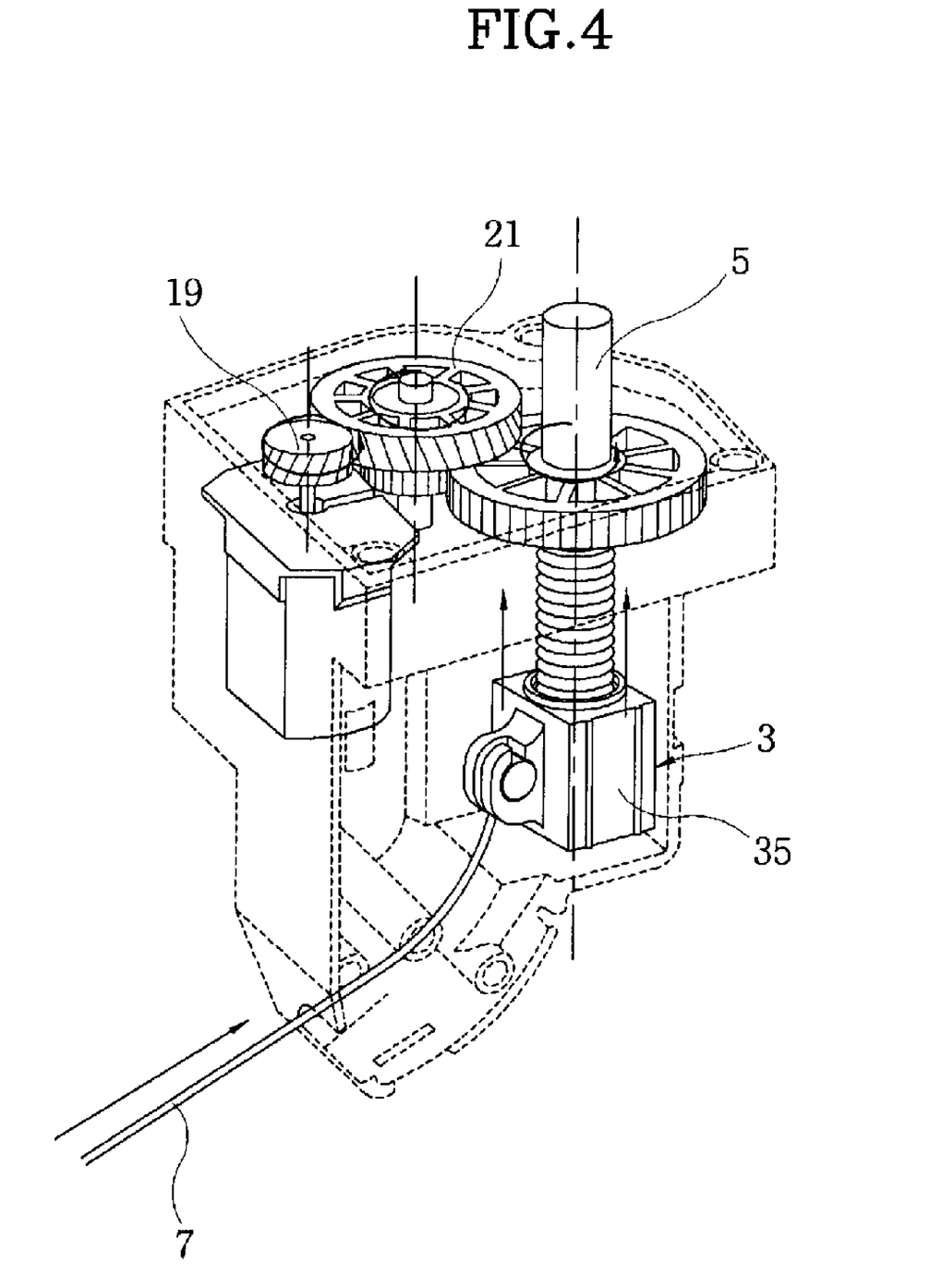
FIG. 4 is a view illustrating when the apparatus of FIG. 1 shifts the transmission to the N-range.

Referring to FIG. 4, when a driver operates the specific switch to perform N-range parking for double parking or parallel parking, the controller operates electric motor 17 and slider 3 slides straight upward in the figure.

As slider 3 pulls cable 7 connected thereto while sliding upward, the motion of cable 7 is transmitted to transmission 9 and transmission 9 is shifted from the P-range state to the N-range state by the mechanism in transmission 9.

Figure 5:
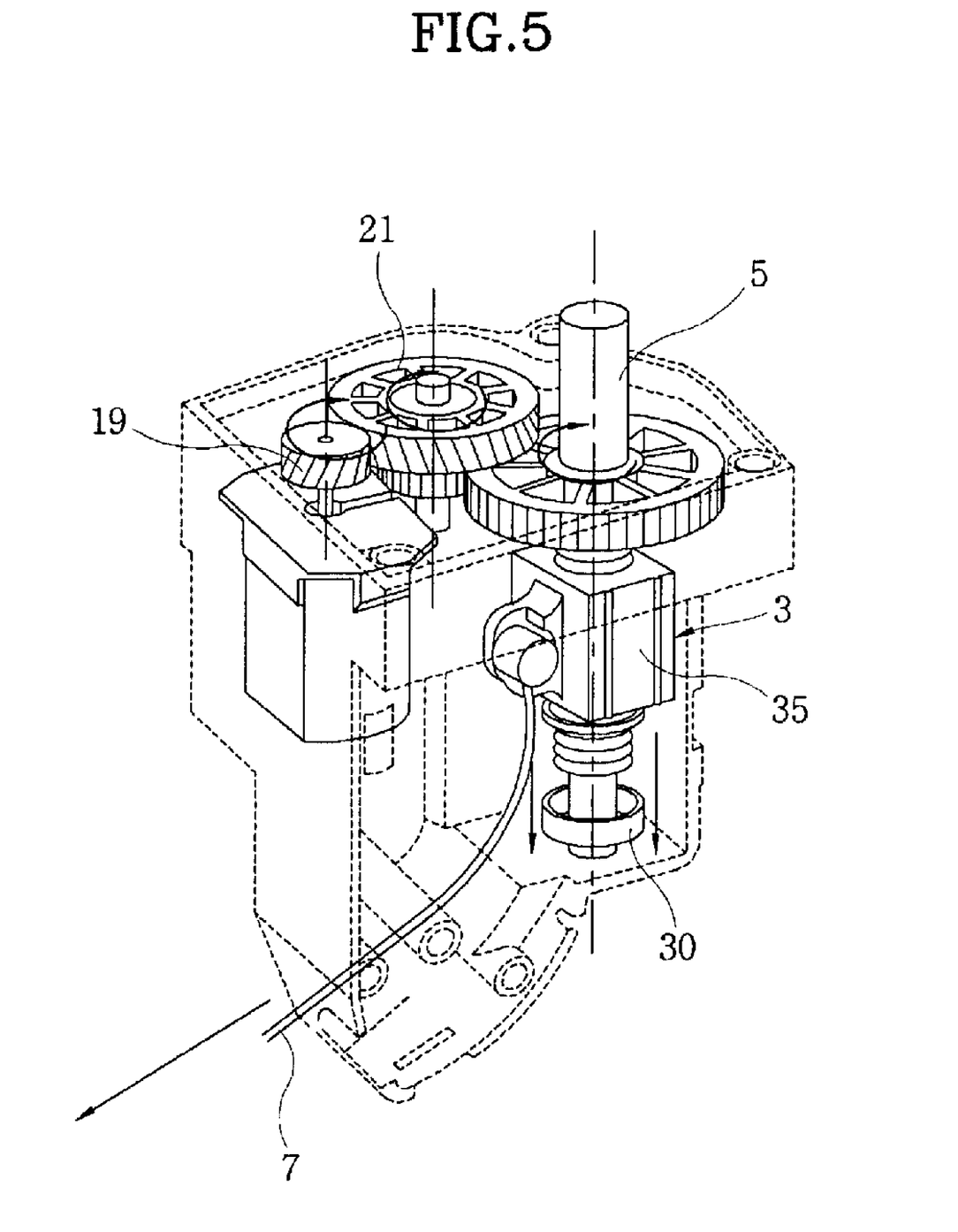
FIG. 5 is a view illustrating when the apparatus of FIG. 1 shifts the transmission to the P-range.

Referring to FIG. 5, an operation removing the N-range parking described above is shown, in which as the controller rotates electric motor 17 in the opposite direction to the above by the operation of the driver, slider 3 is slid straight downward by driving screw 5 and this motion is transmitted to transmission 9 through cable 7.

In an exemplary embodiment of the present invention, the driving screw 5 may include a stopper 30 at a lower portion thereof such that the movement of the slider 3 beyond the stopper 30 is restricted by the stopper 30.

Since transmission 9 can shift to the P-range state by pulling cable 7 with the elastic member, as slider 3 moves down, as described above, cable 7 is pulled and transmission 9 shifts from the N-range state to P-range state.

FIG. 6 illustrates manually shifting between the P-range state and the N-range state, which is to mainly prepare for problems in the electric system, such as discharge, and regulations.

A user can pull or release to shift to the N-range state or the P-range state by rotating manual operating portion 11 at the exposable end of driving screw 5 with a tool, such as a driver 31, through a through hole 37 of the shift lever bracket 23 as shown in the figure, such that driving screw 5 rotates and slider 3 slides straight.

In particular, the thread-fastening between driving screw 5 and slider 3 allows the user to rotate driving screw 5 to move straight slider 3 with relatively small force, such that it can relatively easily operate, as compared with similar devices in other vehicles.

For reference, FIG. 6 exemplifies when the transmission is manually shifted from the N-range to the P-range, when it is discharged in N-range parking.

For convenience in explanation and accurate definition in the appended claims, the terms "upper", "lower", "inner", "outer", "upwards", and "downwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for releasing a parking state of a shift-by-wire shifting device, the apparatus comprising:
    a housing fixed to a vehicle body;
    a driving screw rotatably coupled to the housing and threaded;
    a slider engaged to the driving screw and slidable along the driving screw; and
    a cable connected to the slider and transmitting a sliding motion of the slider to a transmission;
    wherein at least one end of the driving screw is exposed outside the housing;
    wherein a manual operating portion having a non-uniform shape in the rotational direction about a rotational axis of the driving screw to receive torque from the outside is formed at the least one end of the driving screw;
    wherein the vehicle body includes a shift lever bracket having a through hole;
    wherein the manual operating portion is accessible through the through hole; and
    wherein rotation of the manual operating portion by a corresponding driver rotates the driving screw to manually shift between a released N-range state and an engaged P-range state.

2. The apparatus for releasing the parking state of the shift-by-wire shifting device as defined in claim 1, wherein the slider includes a guide surface to be slidably engaged to the housing to prevent the slider from rotating along the driving screw but allow the slider to slide along the driving screw.

3. The apparatus for releasing the parking state of the shift-by-wire shifting device as defined in claim 1, wherein the driving screw includes a stopper at a lower portion thereof to restrict a downward movement of the slider below the stopper.

4. The apparatus for releasing the parking state of the shift-by-wire shifting device as defined in claim 1, wherein the manual operating portion is a driver groove formed at the at least one end of the driving screw.

5. The apparatus for releasing the parking state of the shift-by-wire shifting device as defined in claim 1, wherein:
    a driven gear is integrally formed with the driving screw to reduce and receive rotational force transmitted from the outside, and
    an actuator providing rotational force to the driven gear is further disposed in the housing and engaged with the driven gear.

6. The apparatus for releasing the parking state of the shift-by-wire shifting device as defined in claim 5, wherein:
    the actuator is an electric motor fixed to the housing, and
    an idler gear is disposed and engaged between a pinion of the electric motor and the driven gear of the driving screw to reduce rotational force of the pinion and transmit a rotational force of the actuator to the driven gear.

7. The apparatus for releasing the parking state of the shift-by-wire shifting device as defined in claim 1, wherein the vehicle body is a shift lever bracket having a through hole.

8. The apparatus for releasing the parking state of the shift-by-wire shifting device as defined in claim 1, wherein a mass damper is connected between the transmission and the slider on the cable.

* * * * *